United States Patent
Abe et al.

(10) Patent No.: US 7,382,699 B2
(45) Date of Patent: Jun. 3, 2008

(54) RECORDING DEVICE, PLAYBACK DEVICE, AND CONTENTS TRANSMISSION METHOD

(75) Inventors: Miki Abe, Kanagawa (JP); Tadao Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 10/985,838

(22) Filed: Nov. 10, 2004

(65) Prior Publication Data

US 2005/0117475 A1   Jun. 2, 2005

(30) Foreign Application Priority Data

Nov. 10, 2003   (JP) .............................. 2003-379500

(51) Int. Cl.
 *G11B 5/09* (2006.01)
(52) U.S. Cl. .............................. 369/47.15; 369/47.21; 369/53.44; 369/59.23
(58) Field of Classification Search ...................... None
See application file for complete search history.

(56) References Cited

U.S. PATENT DOCUMENTS 6,606,287 B2 * 8/2003 Korfin et al. ............ 369/47.28
7,133,924 B1 * 11/2006 Rosenberg et al. ...... 369/30.08
2004/0078496 A1 * 4/2004 Kunieda et al. ............... 710/1

FOREIGN PATENT DOCUMENTS

| JP | 10-320400 | 12/1998 |
|----|-----------|---------|
| JP | 2001-346153 A | 12/2001 |
| JP | 2003-116095 A | 4/2003 |

* cited by examiner

*Primary Examiner*—Muhammad Edun
(74) *Attorney, Agent, or Firm*—Wolf, Greenfield & Sacks, P.C.

(57) ABSTRACT

An extracting circuit for extracting meta information from information forming contents is provided. The meta information extracted by the extracting circuit is recorded in a recording medium together with the contents and is used as management information. With this configuration, an object can be searched for based on the contents of the object in a recording device for recording contents, such as moving and still pictures, voices, graphics, and text, in a recording medium.

4 Claims, 16 Drawing Sheets

FIG. 2

UTOC0

| | 1 | 2 | 3 | 4 | |
|---|---|---|---|---|---|
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | cluster H | cluster L | 00000000 | 00000010 | |
| 4 | 00000000 | 00000000 | 00000000 | 00000000 | |
| 5 | 00000000 | 00000000 | 00000000 | 00000000 | |
| 6 | 00000000 | 00000000 | 00000000 | 00000000 | |
| 7 | Maker code | Model code | First TNO | Last TNO | |
| 8 | 00000000 | 00000000 | 00000000 | 00000000 | |
| 9 | 00000000 | 00000000 | 00000000 | 00000000 | |
| 10 | 00000000 | 00000000 | 00000000 | Disc Serial NO | |
| 11 | DISC ID | | P-DFA | P-EMPTY | |
| 12 | P-FRA | P-TNO 1 | P-TNO 2 | P-TNO 3 | SLOT OF POINTER TABLE |
| 13 | P-TNO 4 | P-TNO 5 | P-TNO 6 | P-TNO 7 | |
| 75 | P-TNO 252 | P-TNO 253 | P-TNO 254 | P-TNO 255 | |
| 76 | 00000000 | 00000000 | 00000000 | 00000000 | |
| 77 | 00000000 | 00000000 | 00000000 | 00000000 | |
| 78 | Start address | | | Track mode | SLOT OF PART #1 |
| 79 | End address | | | Link-P | |
| 80 | Start address | | | Track mode | SLOT OF PART #2 |
| 81 | End address | | | Link-P | |
| 586 | Start address | | | Track mode | SLOT OF PART #255 |
| 587 | End address | | | Link-P | |

FIG. 3

UTOC1, U TOC4

| | 1 | 2 | 3 | 4 | |
|---|---|---|---|---|---|
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | cluster H | cluster L | 00000100 | 00000010 | |
| 4 | 00000000 | 00000000 | 00000000 | 00000000 | |
| 5 | 00000000 | 00000000 | 00000000 | 00000000 | |
| 6 | 00000000 | 00000000 | 00000000 | 00000000 | |
| 7 | 00000000 | 00000000 | 00000000 | 00000000 | |
| 8 | 00000000 | 00000000 | 00000000 | 00000000 | |
| 9 | 00000000 | 00000000 | 00000000 | 00000000 | |
| 10 | 00000000 | 00000000 | 00000000 | char. code | |
| 11 | 00000000 | 00000000 | 00000000 | P-EMPTY | |
| 12 | 00000000 | P-TNA 1 | P-TNA 2 | P-TNA 3 | SLOT OF POINTER TABLE |
| 13 | P-TNA 4 | P-TNA 5 | P-TNA 6 | P-TNA 7 | |
| 75 | P-TNA 252 | P-TNA 253 | P-TNA 254 | P-TNA 255 | |
| 76 | Disc name | | | | |
| 77 | Disc name | | | Link-P | |
| 78 | Disc name or Track name | | | | SLOT OF NAME #1 |
| 79 | Disc name or Track name | | | Link-P | |
| 80 | Disc name or Track name | | | | SLOT OF NAME #2 |
| 81 | Disc name or Track name | | | Link-P | |
| 586 | Disc name or Track name | | | | SLOT OF NAME #255 |
| 587 | Disc name or Track name | | | Link-P | |

4 BYTES

INPUT IMAGE

PREPROCESSING

EXTRACT FEATURE QUANTITY

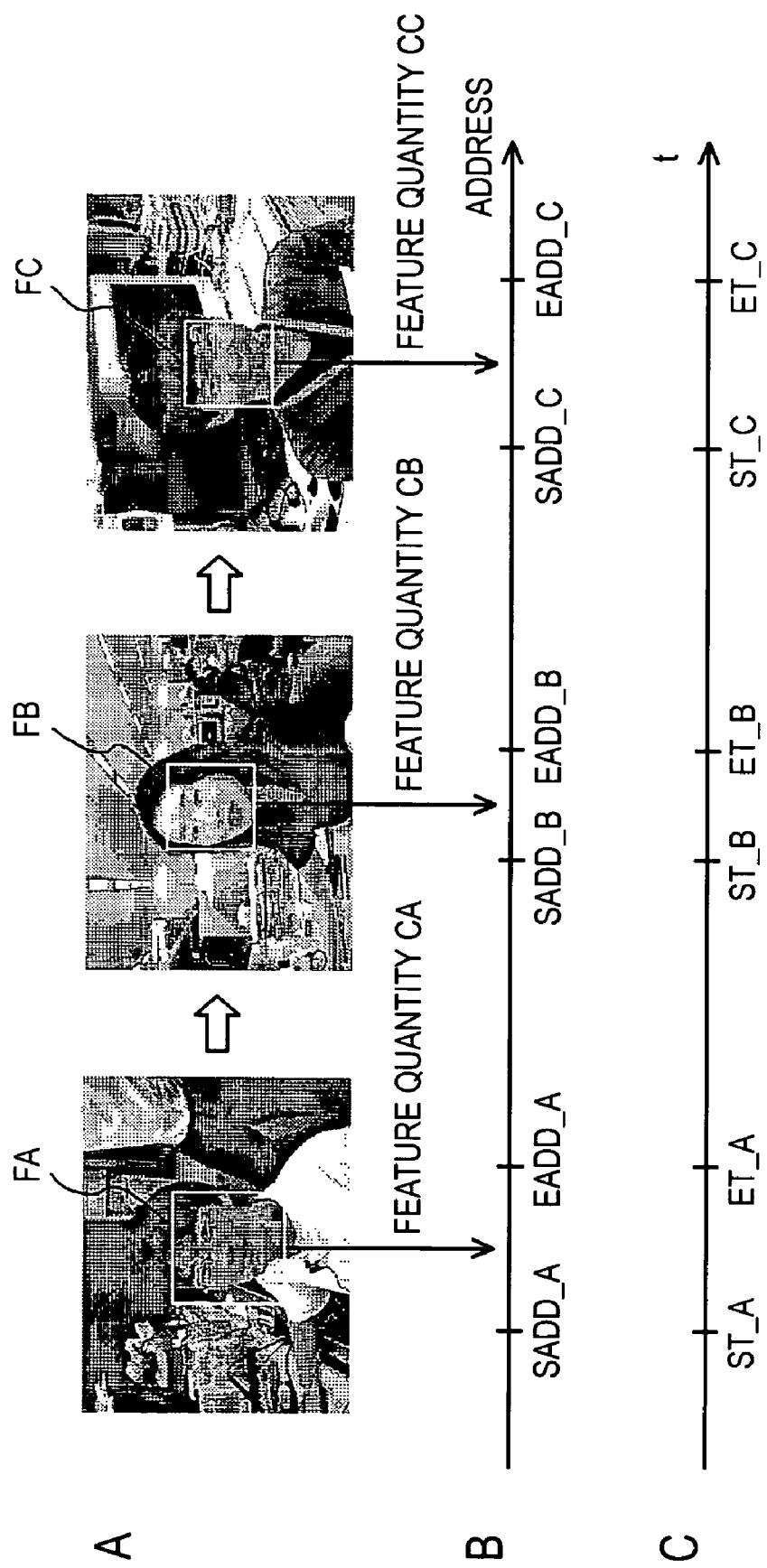

FIG. 9

LINK TABLE

| | 4 BYTES | | | | |
|---|---|---|---|---|---|
| | 1 | 2 | 3 | 4 | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | cluster H | cluster L | 00000000 | 00000010 | |
| 4 | 00000000 | 00000000 | 00000000 | 00000000 | |
| 5 | 00000000 | 00000000 | 00000000 | 00000000 | |
| 6 | 00000000 | 00000000 | 00000000 | 00000000 | |
| 7 | Maker code | Model code | First TNO | Last TNO | |
| 8 | 00000000 | 00000000 | 00000000 | 00000000 | |
| 9 | 00000000 | 00000000 | 00000000 | 00000000 | |
| 10 | 00000000 | 00000000 | 00000000 | Disc Serial NO | |
| 11 | DISC ID | | P-DFA | P-EMPTY | |
| 12 | P-FRA | P-FADR 1 | P-FADR 2 | P-FADR 3 | SLOT OF POINTER TABLE |
| 13 | P-FADR 4 | P-FADR 5 | P-FADR 6 | P-FADR 7 | |
| ~ | ~ | ~ | ~ | ~ | |
| 75 | P-FADR 252 | P-FADR 253 | P-FADR 254 | P-FADR 255 | |
| 76 | 00000000 | 00000000 | 00000000 | 00000000 | |
| 77 | 00000000 | 00000000 | 00000000 | 00000000 | |
| 78 | Start address | | | | SLOT OF FACE OBJECT #1 |
| 79 | End address | | | Link-P | |
| 80 | Start address | | | | SLOT OF FACE OBJECT #2 |
| 81 | End address | | | Link-P | |
| ~ | ~ | | | ~ | |
| 586 | Start address | | | | SLOT OF FACE OBJECT #255 |
| 587 | End address | | | Link-P | |

FIG. 10

ENTRY TABLE

| | 4 BYTES | | | | |
|---|---|---|---|---|---|
| | 1 | 2 | 3 | 4 | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | cluster H | cluster L | 00000100 | 00000010 | |
| 4 | 00000000 | 00000000 | 00000000 | 00000000 | |
| 5 | 00000000 | 00000000 | 00000000 | 00000000 | |
| 6 | 00000000 | 00000000 | 00000000 | 00000000 | |
| 7 | 00000000 | 00000000 | 00000000 | 00000000 | |
| 8 | 00000000 | 00000000 | 00000000 | 00000000 | |
| 9 | 00000000 | 00000000 | 00000000 | 00000000 | |
| 10 | 00000000 | 00000000 | 00000000 | char. code | |
| 11 | 00000000 | 00000000 | 00000000 | | |
| 12 | 00000000 | P-FNO 1 | P-FNO 2 | P-FNO 3 | SLOT OF POINTER TABLE |
| 13 | P-FNO 4 | P-FNO 5 | P-FNO 6 | P-FNO 7 | |
| ~ | ~ | ~ | ~ | ~ | |
| 75 | P-FNO 252 | P-FNO 253 | P-FNO 254 | P-FNO 255 | |
| 76 | | | | | |
| 77 | | | | | |
| 78 | FEATURE QUANTITY | | | | SLOT OF FACE OBJECT #1 |
| 79 | | | | Link-P | |
| 80 | FEATURE QUANTITY | | | | SLOT OF FACE OBJECT #2 |
| 81 | | | | Link-P | |
| ~ | ~ | | | ~ | |
| 586 | FEATURE QUANTITY | | | | SLOT OF FACE OBJECT #255 |
| 587 | | | | Link-P | |

FIG. 13

LINK TABLE

| | 1 | 2 | 3 | 4 | |
|---|---|---|---|---|---|
| 0 | 00000000 | 11111111 | 11111111 | 11111111 | |
| 1 | 11111111 | 11111111 | 11111111 | 11111111 | HEADER |
| 2 | 11111111 | 11111111 | 11111111 | 00000000 | |
| 3 | cluster H | cluster L | 00000000 | 00000010 | |
| 4 | 00000000 | 00000000 | 00000000 | 00000000 | |
| 5 | 00000000 | 00000000 | 00000000 | 00000000 | |
| 6 | 00000000 | 00000000 | 00000000 | 00000000 | |
| 7 | Maker code | Model code | First TNO | Last TNO | |
| 8 | 00000000 | 00000000 | 00000000 | 00000000 | |
| 9 | 00000000 | 00000000 | 00000000 | 00000000 | |
| 10 | 00000000 | 00000000 | 00000000 | Disc Serial NO | |
| 11 | DISC ID | | P-DFA | P-EMPTY | |
| 12 | P-FRA | P-VADR 1 | P-VADR 2 | P-VADR 3 | |
| 13 | P-VADR 4 | P-VADR 5 | P-VADR 6 | P-VADR 7 | SLOT OF POINTER TABLE |
| 75 | P-VADR 252 | P-VADR 253 | P-VADR 254 | P-VADR 255 | |
| 76 | 00000000 | 00000000 | 00000000 | 00000000 | |
| 77 | 00000000 | 00000000 | 00000000 | 00000000 | |
| 78 | Start address | | | | SLOT OF VOICE OBJECT #1 |
| 79 | End address | | | Link-P | |
| 80 | Start address | | | | SLOT OF VOICE OBJECT #2 |
| 81 | End address | | | Link-P | |
| 586 | Start address | | | | SLOT OF VOICE OBJECT #255 |
| 587 | End address | | | Link-P | |

4 BYTES

FIG. 14

ENTRY TABLE

| | 1 | 2 | 3 | 4 | |
|---|---|---|---|---|---|
| | \<--- 4 BYTES ---\> | | | | |
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | cluster H | cluster L | 00000100 | 00000010 | |
| 4 | 00000000 | 00000000 | 00000000 | 00000000 | |
| 5 | 00000000 | 00000000 | 00000000 | 00000000 | |
| 6 | 00000000 | 00000000 | 00000000 | 00000000 | |
| 7 | 00000000 | 00000000 | 00000000 | 00000000 | |
| 8 | 00000000 | 00000000 | 00000000 | 00000000 | |
| 9 | 00000000 | 00000000 | 00000000 | 00000000 | |
| 10 | 00000000 | 00000000 | 00000000 | char.c ode | |
| 11 | 00000000 | 00000000 | 00000000 | | |
| 12 | 00000000 | P-VNO 1 | P-VNO 2 | P-VNO 3 | SLOT OF POINTER TABLE |
| 13 | P-VNO 4 | P-VNO 5 | P-VNO 6 | P-VNO 7 | |
| ~ | ~ | ~ | ~ | ~ | |
| 75 | P-VNO 252 | P-VNO 253 | P-VNO 254 | P-VNO 255 | |
| 76 | | | | | |
| 77 | | | | | |
| 78 | FEATURE QUANTITY | | | | SLOT OF VOICE OBJECT #1 |
| 79 | | | | Link-P | |
| 80 | FEATURE QUANTITY | | | | SLOT OF VOICE OBJECT #2 |
| 81 | | | | Link-P | |
| ~ | ~ | ~ | ~ | ~ | |
| 586 | FEATURE QUANTITY | | | | SLOT OF VOICE OBJECT #255 |
| 587 | | | | Link-P | |

RECORDING DEVICE, PLAYBACK DEVICE, AND CONTENTS TRANSMISSION METHOD

BACKGROUND OF THE INVENTION

1. Field of the Invention

The present invention relates to a recording device, a playback device, and a contents transmission method.

2. Description of the Related Art

In an information searching device, image information obtained from an image capturing unit is recognized as text data or image-pattern data and the recognition result is used as a keyword for searching a database. In this type of information searching device, a keyword used for searching for information is created by processing image information, and thus the input speed and accuracy of the keyword can be improved.

A mini disc (MD) is used as a rewritable magneto-optical disc. In the MD, as shown in FIG. 16, an area for recording/playback includes a data area and a UTOC (user table of contents) area in the inner side. Various contents, such as audio and video digital data or graphics and text digital data, are stored in the data area.

On the other hand, address information and a contents attribute of the data area are stored in the UTOC area. The UTOC area includes areas UTOC0, UTOC1, and UTOC4. Address information of the contents is stored in the area UTOC0, and the names of disc and tracks are stored in the area UTOC1 or UTOC4 in an ASCII code or multibyte code.

Accordingly, in the MD, the contents are distinguished from each other by using the name information stored in the area UTOC1 or UTOC4, and desired contents can be searched for by referring to the address information stored in the area UTOC0.

For example, Patent Document 1: Japanese Unexamined Patent Application Publication No. 11-45277 can be cited as a related art document.

As described above, when contents are to be played back from an MD, the contents can be searched for by using the name information and address information stored in the UTOC area.

In order to search for the contents, however, a disc name and a track name have to be input by referring to a title database during a recording process or manually during a playback process.

Also, information recorded in the area UTOC1 or UTOC4 includes only the names of disc and tracks, but does not include meta information (feature data) of the contents, such as moving or still pictures, voices, graphics, and text.

SUMMARY OF THE INVENTION

The present invention has been made in order to solve the above-described problems.

According to an aspect of the present invention, a recording device for recording contents, such as moving and still pictures, voices, graphics, and text, in a recording medium includes an extracting unit for extracting, from information forming contents, meta information representing a feature of the information; and a recording unit for recording the meta information extracted by the extracting unit as management information by associating the meta information with the contents.

With this invention, an object can be searched for based on the contents of the object.

BRIEF DESCRIPTION OF THE DRAWINGS

FIG. 2 shows an example of a data table;
FIG. 3 shows an example of a data table;
FIG. 7 shows an example of the correspondence among feature quantities, addresses, and time;
FIG. 9 shows an example of a data table;
FIG. 10 shows an example of a data table;
FIG. 13 shows an example of a data table;
FIG. 14 shows an example of a data table.

DESCRIPTION OF THE PREFERRED EMBODIMENT

[1] Recording/Playback Device

Figure 1:
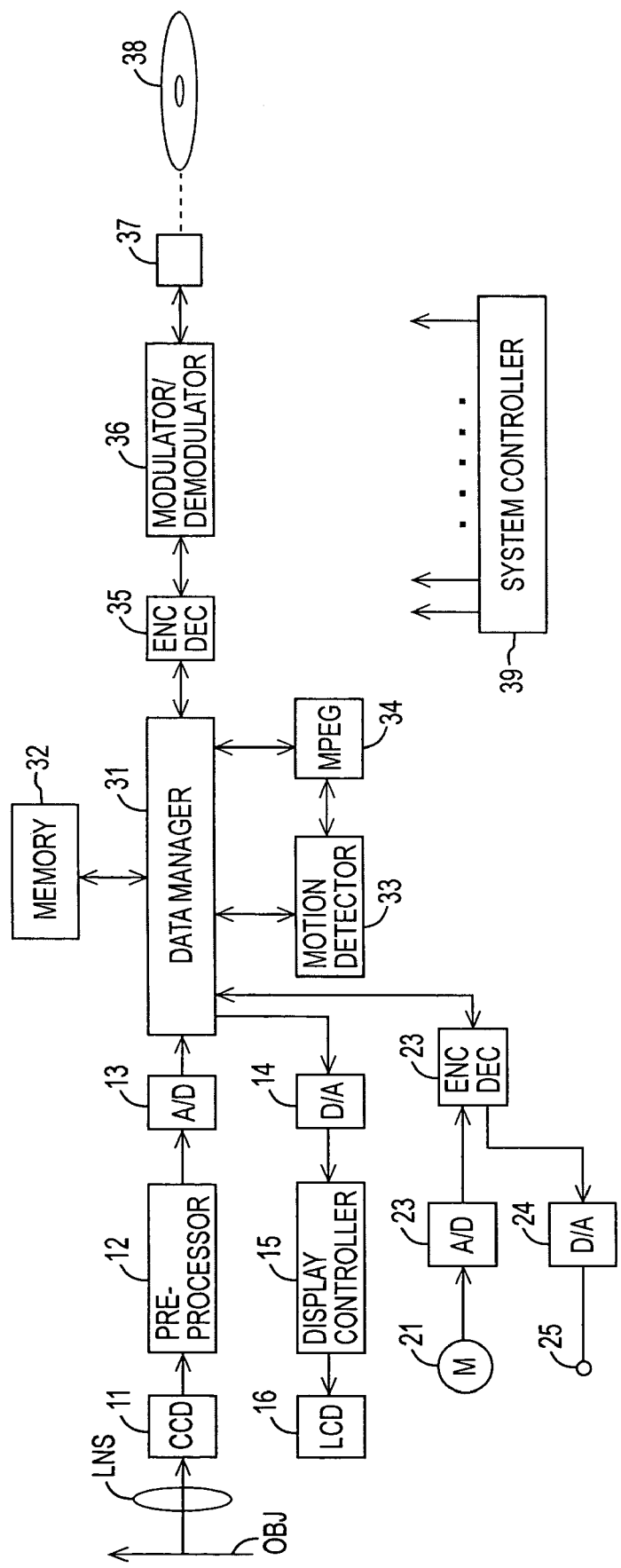
FIG. 1 shows a recording/playback device of an embodiment of the present invention.

FIG. 1 shows an example of a recording/playback device to which the present invention can be applied. In this example, a recording/playback device including a video camera and an MD are used as the recording/playback device and a recording medium.

In FIG. 1, when a recording process is performed, the image of an object OBJ is projected onto a CCD (charge-coupled device) image sensor 11 through an image-capturing lens LNS, and a color image signal of the object OBJ is obtained from the CCD image sensor 11. The color image signal is supplied to a preprocessor 12, preprocessing such as sampling hold and AGC (automatic gain control) is performed thereto, and then the color image signal is supplied to an A/D (analog to digital) converter 13 so as to be converted to a digital video signal. Then, the digital video signal is supplied to a data manager 31.

A memory 32 for a buffer, a motion detector 33, and an MPEG (Motion Picture Experts Group) encoder/decoder 34 are connected to the data manager 31. The digital video signal supplied to the data manager 31 is compressed, for example, by the MPEG2 method. Also, an audio signal captured through a microphone 21 is supplied to an A/D converter 22 so as to be converted to a digital audio signal. The digital audio signal is supplied to an encoder/decoder 23 so as to be compressed by ATRAC® (Adaptive TRansform Acoustic Coding), for example, and is then supplied to the data manager 31.

The digital video and audio signals supplied to the data manager 31 are combined into a streaming signal and is output therefrom.

Then, the streaming signal is supplied to an encoder/decoder 35, is divided into segments each having a data length corresponding to the format of the MD as a recording medium, encode processing for error correction is performed thereto, and the processed signal is supplied to a modulator/demodulator 36. This signal is regarded as a modulated signal to be recorded, is supplied to a recording/playback head 37, and is then recorded in an MD 38.

During the recording process, the contents stored in the UTOC area of the MD 38 are updated in accordance with a recorded signal. Also, at this time, the digital video signal is output from the data manager 31, is supplied to a D/A (digital to analog) converter 14 so as to be converted to an analog video signal, and the analog video signal is supplied to an LCD (liquid crystal display) 16 serving as a monitor through a display controller 15. Accordingly, images captured by the CCD image sensor 11 are displayed on the LCD 16.

Reference numeral 39 denotes a system controller including a micro computer, which controls and manages the above-described recording process and also controls and manages a playback process described below.

In a playback process, the modulated signal is played back from the MD 38 by the recording/playback head 37, the played back signal is supplied to the modulator/demodulator 36 and to the encoder/decoder 35 sequentially so that the original streaming signal is obtained, and the streaming signal is supplied to the data manager 31. Then, a decompressed digital video signal and a compressed digital audio signal can be obtained separately.

Then, the digital video signal is supplied to the D/A converter 14 so as to be converted to an analog video signal, the analog video signal is supplied to the LCD 16 serving as a monitor through the display controller 15, and an image played back from the MD 38 is displayed on the LCD 16. ALso, the digital audio signal output from the data manager 31 is supplied to the encoder/decoder 23 and to a D/A converter 24 sequentially so as to be decompressed and converted to an analog audio signal, and the analog audio signal is output to an output terminal 25.

[2] Mini Disc

In the MD, even if a signal to be recorded thereon is a temporally continuous signal, such as an audio signal and a video signal, the signal can be discretely recorded on the disc. Therefore, in the MD, the UTOC area has a structure shown in FIGS. 2 and 3, for example.

That is, in the MD, each cluster is composed of 32 sectors for storing original digital data and 4 sectors for linking clusters. In this case, each sector is composed of 2352 bytes, and thus each cluster is composed of 84672 bytes (=2352 bytes×32 sectors+2352 bytes×4 sectors).

Data is recorded on the MD in units of clusters. The UTOC area includes the areas UTOC0, UTOC1, and UTOC4, as described above, and a sector is assigned to each of the areas UTOC0, UTOC1, and UTOC4.

FIG. 2 specifically illustrates the sector for the area UTOC0. In this figure, an area of 2352 bytes in a sector is shown in a table of 588 bytes×4 bytes. In the following description, an area composed of 4 bytes in the horizontal direction corresponds to one location, and 0th to 587th locations are aligned in the vertical direction (that is, each location is composed of 4 bytes). Herein, data recorded in the data area of the MD is regarded as musical songs.

The data in the 0th to 3rd locations serves as a header, and a pointer P-TNO$n$ ($n$=1 to 255) regarding the recording position of the n-th song is written in each byte from the 2nd byte of the 12th location to the 4th byte of the 75th location. Also, 255 pairs of Start address and End address indicating the recording start/end positions of the n-th song are written in the area defined by the 1st to 3rd bytes of the 78th to 587th locations.

In this case, the location indicated by the pointer P-TNO$n$ is a location in which the Start address of the n-th song is written, and the following location is a location in which the End address is written. That is, if P-TNO$n$=m, the Start address of the n-th song is written in the (76+m×2)-th location and the End address thereof is written in the following (76+m×2+1)-th location.

The clusters on the disc are sequentially used from a recording start position indicated by a Start address to a recording end position indicated by an End address. Hereinafter, a recording area defined by a pair of Start address and End address is called a "part". The number of parts is equal to the number of pairs of Start address and End address, that is, 255.

Further, if the clusters on the disc cannot be used sequentially for a song, that is, if a song uses a plurality of parts, the order of the parts must be known. In that case, a link pointer Link-P is provided at the 4th byte after each End address of the 78th to 587th locations. The link pointer Link-P specifies the Start address of the following part, as the part pointer P-TNO$n$. If there is no following part, that is, if the part is the last part of a corresponding song, the link pointer Link-P is set to 0, for example.

Also, mode data TRACK Mode, indicating the processing mode of each part, is written at the 4th byte after each Start address of the 78th to 587th locations. This allows to recognize inhibition of copy and writing or emphasis on a corresponding part.

Figure 4:
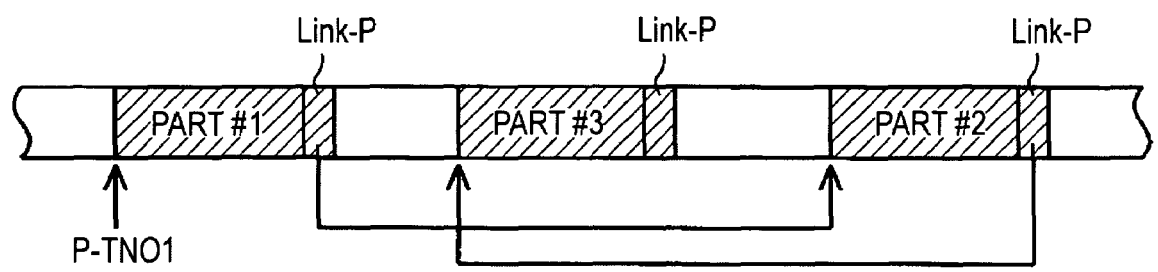
FIG. 4 illustrates recording positions of data.

For example, as shown in FIG. 4, if a track is composed of parts #1, #2, and #3, the Start address of part #1 is indicated by a pointer P-TNO1 in the area UTOC0, the Start address of the following part #2 is indicated by the link pointer Link-P of part #1, and the Start address of the following part #3 is indicated by the link pointer Link-P of part #2. The link pointer Link-P of part #3 is set to 0.

As shown in FIG. 2, the format of each of the Start address and End address is composed of 3 bytes. The 14 bits from the top indicate the cluster number on the disc, the following 6 bits indicate the sector number in the cluster, and the last 4 bits indicate the sound group number in the sector. With this structure, a position on the disc can be specified in units of sound groups by using the Start address and End address.

The MD has the above-described format, and thus digital data can be additionally recorded or overwritten thereon, or partially erased therefrom. The erasing process can be realized by rewriting the area UTOC0 without actually clearing digital data in the data area.

FIG. 3 specifically illustrates the sector in the areas UTOC1 and UTOC4. In this figure, the sector in the areas UTOC1 and UTOC4 is shown in a table form as in FIG. 2. The name of MD and the track name of songs are stored in an ASCII code in the area UTOC1, and they are store in a multibyte code in the area UTOC4.

The data in the 0th to 3rd locations serves as a header, and a pointer P-TNA$n$ ($n$=1 to 255) regarding the recording position of the track name of the n-th song is written in each byte from the 2nd byte of the 12th location to the 4th byte of the 75th location.

Also, the disc name or the track name of the n-th song is written in the 76th to 587th locations except the 4th byte of the odd-numbered locations. Further, a link pointer Link-P is provided at the 4th byte of the odd-numbered locations in the 76th to 587th locations. The link pointer Link-P specifies the Start address of the following part, as the pointer P-TNA$n$.

Accordingly, in the recording/playback device described in part [1], original digital data is written in the data area and the tables in the UTOC area are updated according to the written data during a recording process. On the other hand, during a playback process, desired digital data is retrieved by referring to the tables in the UTOC area.

[3] Extraction of the Contents of an Object (1)

Now, communication using a face image is used as the contents of an object to be recorded. Hereinafter, a case where the face of a person to be recorded is recognized will be described as an example of extracting the contents of an object.

Various methods for recognizing a face have been proposed. In each of the methods, as shown in FIG. 5, a face recognizing circuit includes a face-position detecting block (41 and 42) for detecting the position of a face based on an input video signal, a specific processing block (43 to 46) for extracting unique data from the face image, and a matching block (51 to 54) for comparing the unique data with data registered in advance.

Figure 5:
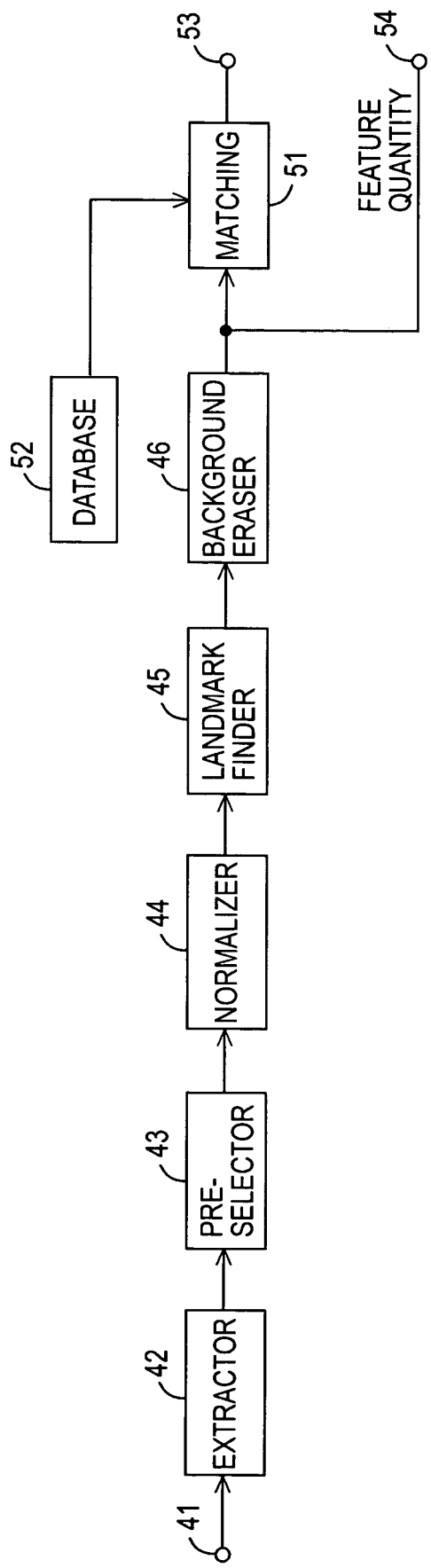
FIG. 5 shows an example of a face recognizing circuit.

The face recognizing circuit shown in FIG. 5 is used when both of wavelet transform and graphical matching are adopted. About 50 points of feature points called nodes are set on parts of a face, and a feature quantity, such as directivity, density, and position, at each node is extracted by wavelet transform. Accordingly, data unique to a person to be recorded is created based on the extracted feature quantities.

Figure 6A:
FIGS. 6A to 6C show an example of a method for extracting a feature quantity.
Figure 6B:
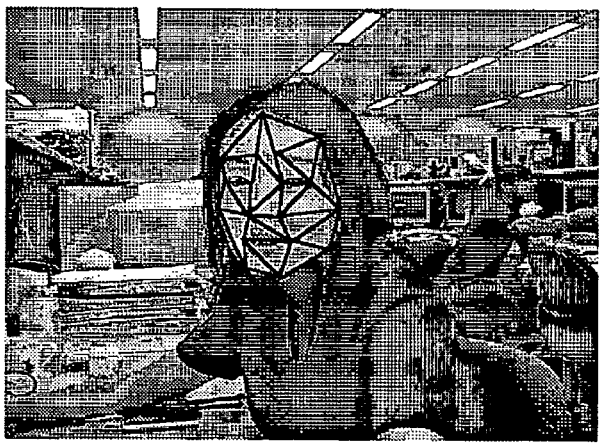

For example, a video signal of an image shown in FIG. 6A is supplied through an input terminal 41 to an extractor 42, and a part including motion is extracted from sequential frames of the video signal. Alternatively, in the extractor 42, graphical matching is performed on the input video signal by using a small number of nodes, so that the part of a face is extracted. Then, the output of the extractor 42 is supplied to a preselector 43, and parts of the face are specifically detected as shown in FIG. 6B.

Figure 6C:
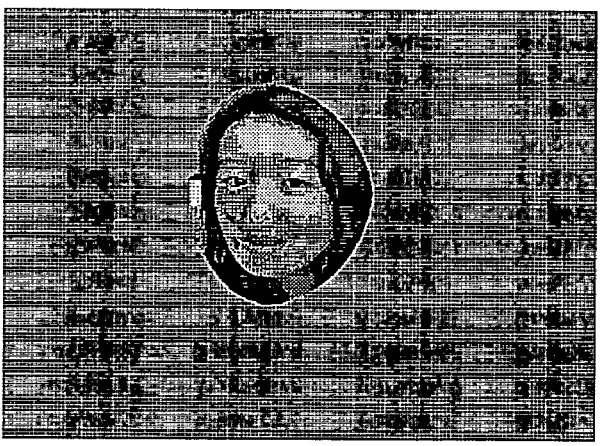

Then, the video signal of the detected face image is supplied to a normalizer 44 so as to be normalized into an optimal size by zooming it, and the video signal of the normalized face image is supplied to a landmark finder 45. Then, each node follows to move to an appropriate position. Then, the output of the landmark finder 45 is supplied to a background eraser 46, the face area is highlighted and the other part is painted all gray as shown in FIG. 6C, and information obtained at each node is extracted as a feature quantity.

In a general face recognizing circuit, the feature quantity extracted by the background eraser 46 is supplied to a matching circuit 51, where the feature is compared with and matched against the data registered on a matching database 52 so as to perform identification, and the result is output to an output terminal 53.

In the present invention, however, the feature quantity (meta information) extracted by the background eraser 46 is output to a terminal 54, and the following processing [4] and so on is performed by using this feature quantity.

[4] Method for Storing Feature Quantity

In the object to be recorded (video signal input through the terminal 41), the feature quantity extracted by the background eraser 46 is the most important information. Accordingly, in the present invention, attention is focused on the extracted feature quantity and the feature quantity is stored in the MD by the UTOC method.

FIG. 7 illustrates an example of the correspondence between the extracted feature quantity and an object to be recorded. That is, as shown in A, when a feature quantity CA of a face image FA is extracted from a video signal, the Start address SADD_A and the End address EADD_A at that time are stored together with the feature quantity CA in the UTOC method, as shown in B.

Also, when feature quantities CB and CC of face images FB and FC are extracted from a video signal, the Start addresses SADD_B and SADD_C and the End addresses EADD_B and EADD_C are stored in the UTOC area together with the feature quantities CB and CC. Alternatively, as shown in C, when feature quantities CA to CC of the face images FA to FC are extracted, the start time ST_A, ST_B, and ST_C and the end time ET_A, ET_B, and ET_C of the extraction are stored in the UTOC method together with the feature quantities CA to CC.

In this way, when face images are detected in the object to be recorded, the address information (start address and end address) or time information (start time and end time) of the object at that time is stored in the UTOC method, together with the feature quantities, as information for associating the feature quantities with the object.

The feature quantities may be stored when a video signal is recorded on the MD. Alternatively, the feature quantities may be sequentially extracted after recording a video signal and may be recorded on the MD. In this way, an object can be searched for by using the feature of a face image as a keyword, and thus the object can be searched for more efficiently.

[5] Example of Method for Storing Feature Quantity

In the MD, as shown in FIGS. 2 to 4, address information stored in the UTOC area defines only the parts constituting a track of contents and the fragmentation.

Figure 8:
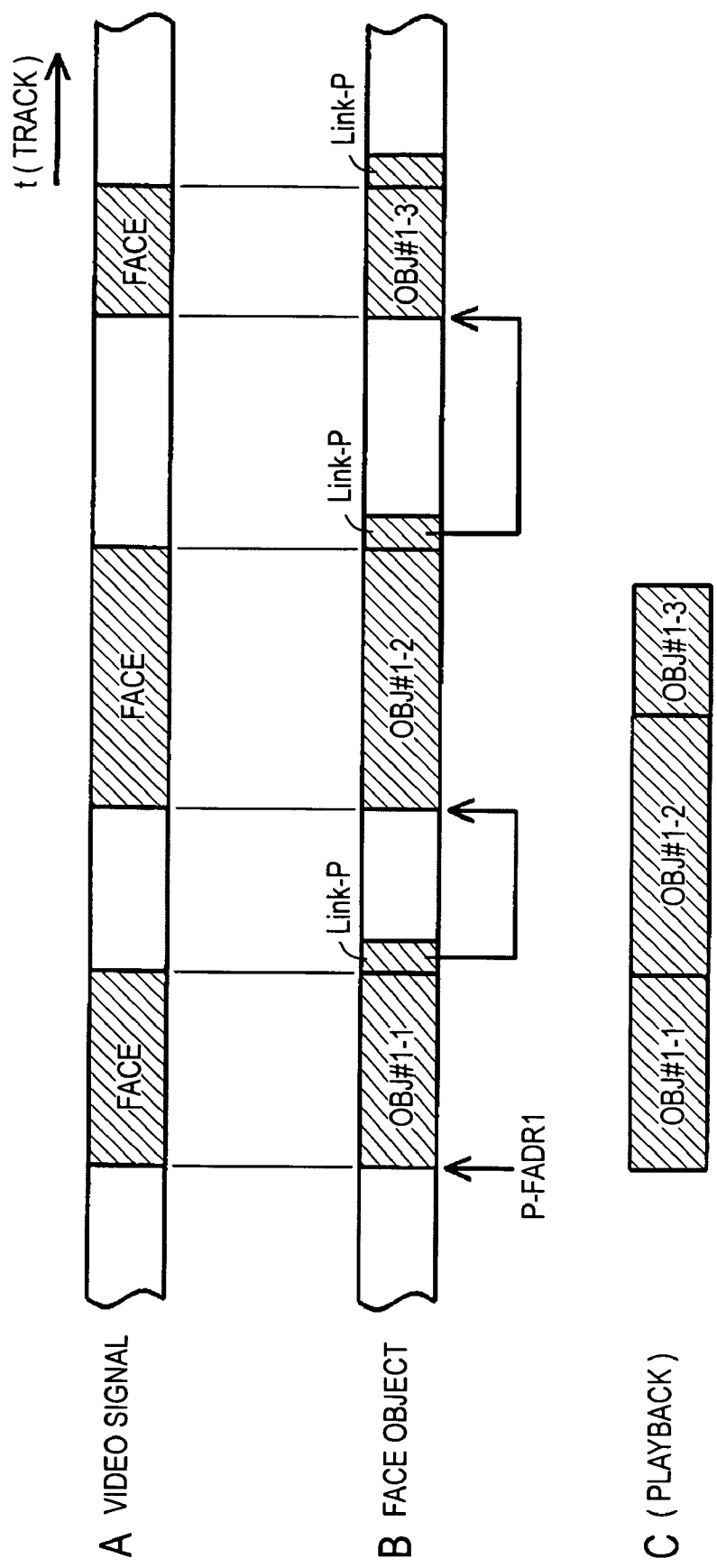
FIG. 8 illustrates recording positions of data.

In this example, a feature quantity is stored in the UTOC method as shown in FIGS. 8 to 10. That is, a video signal recorded on the MD is temporally continuous as shown in A in FIG. 8, but a face of a person as an object (face object) discretely appears in diagonally shaded areas. In other words, the face object appears in the diagonally shaded areas in a track.

Management information for this face object is shown in B in FIG. 8. That is, a pointer P-FADR1 indicates the Start address of an area OBJ#1-1, a link pointer Link-P of this area OBJ#1-1 indicates the Start address of the following area OBJ#1-2, and a link pointer Link-P of this area OBJ#1-2 indicates the Start address of the following area OBJ#1-3.

Therefore, when the video signal shown in A in FIG. 8 is played back by using the pointers shown in B in FIG. 8, only the face object is played back as shown in C in FIG. 8.

In order to realize such a pointer method, data tables shown in FIGS. 9 and 10, for example, are provided in the data area of the MD. Herein, when the face object is recorded in a plurality of areas as show in B in FIG. 8, the data table shown in FIG. 9 serves as a link table for linking the areas, and the table has the same structure as that of the area UTOC0 shown in FIG. 2.

A sector is assigned to this link table and the table has the same structure as in FIG. 2. The data in the 0th to 3rd locations serves as a header, and a pointer P-FADRn (n=1 to 255) regarding the recording position of the n-th face object is written in each byte from the 2nd byte of the 12th location to the 4th byte of the 75th location. Further, 255 pairs of Start address and End address indicating the recording start/end positions of the n-th face object are written in the 1st to 3rd bytes of the 78th to 587th locations.

In this case, the location indicated by the pointer P-FADRn is a location in which the Start address of the n-th face object is written, and the End address is written in the following location.

Further, a link pointer Link-P is provided in the 4th byte after each End address from the 78th to 587th locations, and the link pointer Link-P indicates the Start address of the following part, as the part pointer P-FADRn. If there is no following part, that is, if the part is the last part of a corresponding face object, the link pointer Link-P is set to 0.

For example, as shown in FIG. 8, when a face object OBJ#1 of a first object is recorded in the areas OBJ#1-1, OBJ#1-2, and OBJ#1-3 of a track, a pointer P-FADR1 indicates the Start address of the area OBJ#1-1, the link pointer Link-P of this area OBJ#1-1 indicates the Start address of the following area OBJ#1-2, and the link pointer Link-P of this area OBJ#1-2 indicates the Start address of the following area OBJ#1-3.

As shown in FIG. 9, the format of each of the Start addresses and End addresses is composed of 3 bytes. As the Start address and End address in the UTOC area, the top 14 bits indicate the cluster number on the disc, the following 6 bits indicate the sector number in the cluster, and the last 4 bits indicate the sound group number in the sector. Therefore, by using the Start address and End address, a position on the disc can be specified in units of sound groups.

On the other hand, the data table shown in FIG. 10 is an entry table including Start addresses of the first areas in which face objects are recorded. The entry table has the same structure as that in the area UTOC1 shown in FIG. 3.

That is, a sector is assigned to this entry table, and the table has the same structure as that in FIG. 3. The data in the 0th to 3rd locations serves as a header, and a pointer P-FNOn (n=1 to 255) regarding the recording position of the n-th face object is written in each byte from the 2nd byte of the 12th location to the 4th byte of the 75th location. Further, in the 78th to 587th locations, each entire even-numbered location and each odd-numbered location except the 4th byte form a pair, and information of a feature quantity of the n-th face object is written in the n-th pair.

With this structure, the recording area of a face object having a feature quantity can be known by referring to the entry table (FIG. 10) and the link table (FIG. 9).

[6] Method for Registering and Searching for a Face Object

Herein, suppose face objects appear as shown in A and B in FIG. 8. After the feature quantity of the first face object OBJ#1-1 has been extracted in the face recognizing circuit shown in FIG. 5, the feature quantity is compared with data in the matching database 52. Then, if the feature quantity of the face object OBJ#1-1 matches the feature quantity of the face object OBJ#1 registered on the matching database 52, the feature quantity is registered on the entry table.

If the matching database 52 is not provided or if the feature quantity of the face object OBJ#1-1 is not registered on the matching database 52, the feature quantity of the face object OBJ#1-1 is registered as the feature quantity of a new face object OBJ#1 on the matching database 52. When feature quantities of a face object are compared, the difference between the feature quantities is determined. If the difference is smaller than a predetermined threshold, it is judged that the both quantities match. Otherwise, it is judged that the both quantities do not match.

After the feature quantity of the second face object OBJ#1-2 has been extracted, the same processing as that performed after the feature quantity of the first face object OBJ#1-1 has been extracted is performed. Likewise, after the feature quantity of the third face object OBJ#1-3 has been extracted, the same processing as that performed after the feature quantity of the second face object OBJ#1-2 has been extracted is performed.

Therefore, the face objects OBJ#1-1 to OBJ#1-3 are linked as shown in B in FIG. 8, and the feature quantities thereof can be used as keywords for search.

On the other hand, when search (playback) is performed, after the face object OBJ#1 registered on the matching database 52 is specified, the Start address of the first face object OBJ#1-1 can be known by the pointer P-FADRn for the Start address of the face object OBJ#1. Also, the Start address of the second face object OBJ#1-2 can be known by the link pointer Link-P of the face object OBJ#1-1, and the Start address of the third face object OBJ#1-3 can be known by the link pointer Link-P of the face object OBJ#1-2.

Accordingly, only the specified face object OBJ#1 can be continuously played back. As shown in C in FIG. 8, it appears as if a continuous track of just the face object OBJ#1 exists. The method for searching for and playing back an object is not limited to the above-described method of using link pointers Link-P. Alternatively, the feature quantities of recorded face objects may be sequentially compared with the feature quantities of the face objects registered on the matching database 52, and only a video signal corresponding to a feature quantity having a high similarity may be continuously played back.

[7] Extraction of Contents of an Object (2)

Recognition of a person's face is performed in the above-described part [3]. Hereinafter, a case where recognition of a speaker is used will be described.

Figure 11:
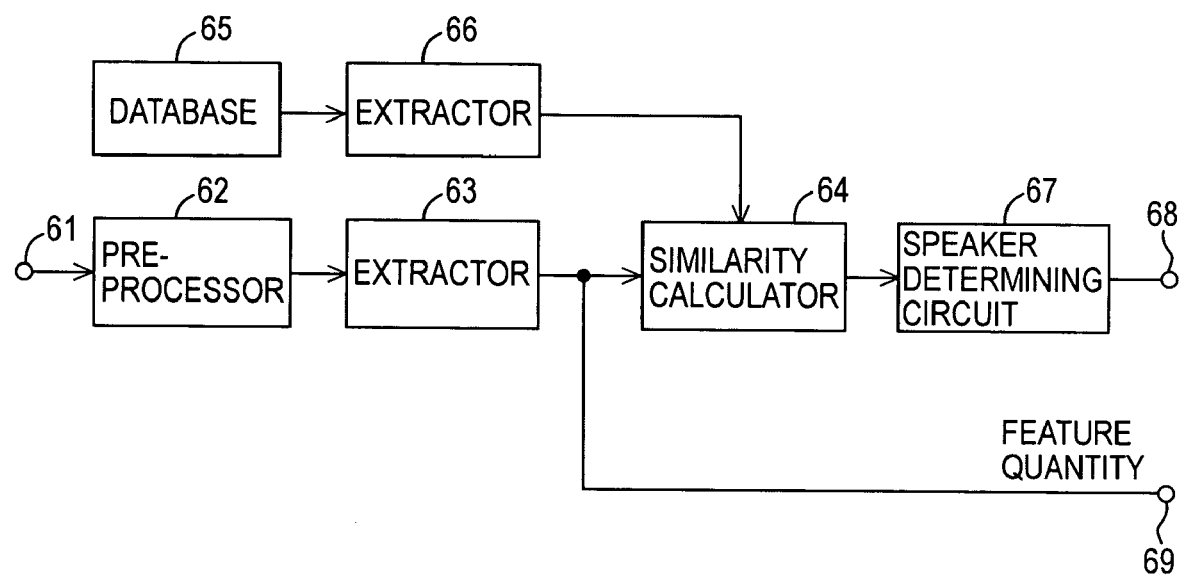
FIG. 11 shows an example of a speaker recognizing circuit.

Various methods for recognizing a speaker have been proposed. In each method, a recognizing circuit has the configuration shown in FIG. 11. That is, a voice signal from a speaker is supplied to a preprocessor 62 through an input terminal 61, preprocessing, such as band limitation and normalization of a signal level, is performed in the preprocessor 62, the processed signal is supplied to a feature parameter extractor 63 so that a feature parameter is extracted from the signal, and then the feature parameter is supplied to a similarity calculator 64.

Also, voice data registered on a database 65 is extracted therefrom, the voice data is supplied to a feature parameter extractor 66 so that a feature parameter is extracted, and the feature parameter is supplied to the similarity calculator 64. Then, in the similarity calculator 64, the similarity between the voice signal supplied through the terminal 61 and the voice data registered on the database 65 is calculated. The calculation result is supplied to a speaker determining circuit 67, and a determination result specifying the speaker (who has supplied the voice signal through the terminal 61) is output to a terminal 68.

The parameter of the speaker output from the feature parameter extractor 63 is output as a feature quantity to a terminal 69, and the feature quantity is stored in the entry table and the link table, as the feature quantity of the cases described in [3] to [5].

Figure 12:
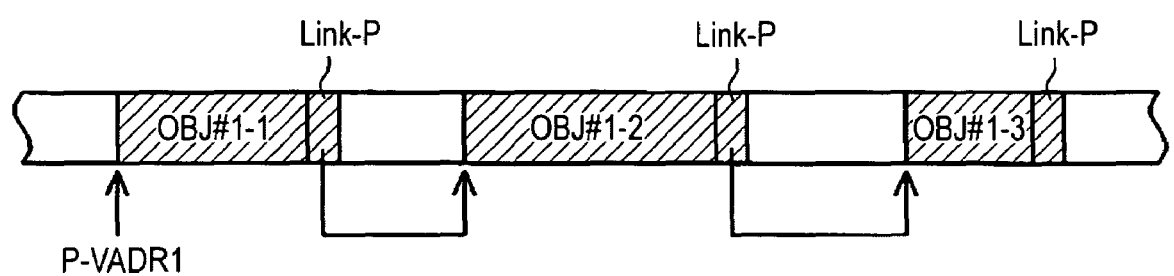
FIG. 12 illustrates recording positions of data.

That is, as shown in FIG. 12, for example, a feature quantity OBJ#1 of the first object is recorded in areas OBJ#1-1, OBJ#1-2, and OBJ#1-3 of a track, and a feature quantity OBJ#2 of the second object is recorded in areas OBJ#2-1, OBJ#2-2, and OBJ#2-3. Accordingly, the Start address of the area OBJ#1-1 is indicated by a pointer P-VADR1, the Start address of the following area OBJ#1-2 is indicated by the link pointer Link-P of the area OBJ#1-1, and the Start address of the following area OBJ#1-3 is indicated by the link pointer Link-P of the area OBJ#1-2.

In order to realize such a pointer method, data tables shown in FIGS. 13 and 14 are provided in the data area of the MD. These data tables have the same configurations as those of the data tables shown in FIGS. 9 and 10. The TOC area shown in FIG. 13 is a link table and the data table shown in FIG. 14 is an entry table.

Accordingly, a recording area for a speaker can be known by referring to the entry table and link table.

[8] Method for Storing Feature Quantity (2)

In the above-described [4] to [7], a feature quantity is stored in the UTOC method. Alternatively, as shown in FIG. 15, the feature quantity can be stored in a track information table method, which is adopted in personal computers or the like.

Figure 15:
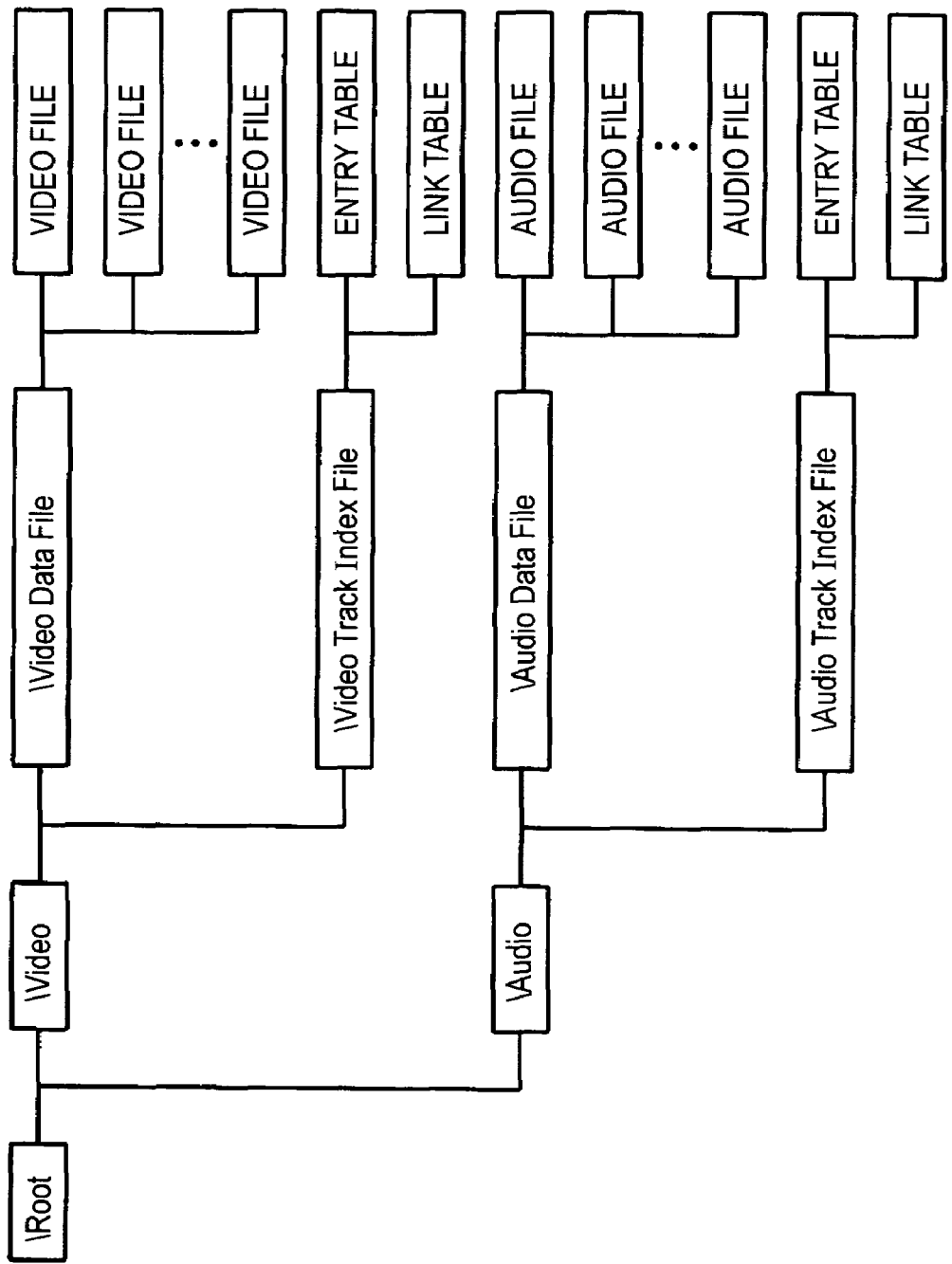
FIG. 15 shows an example of a data tree.
Figure 16:
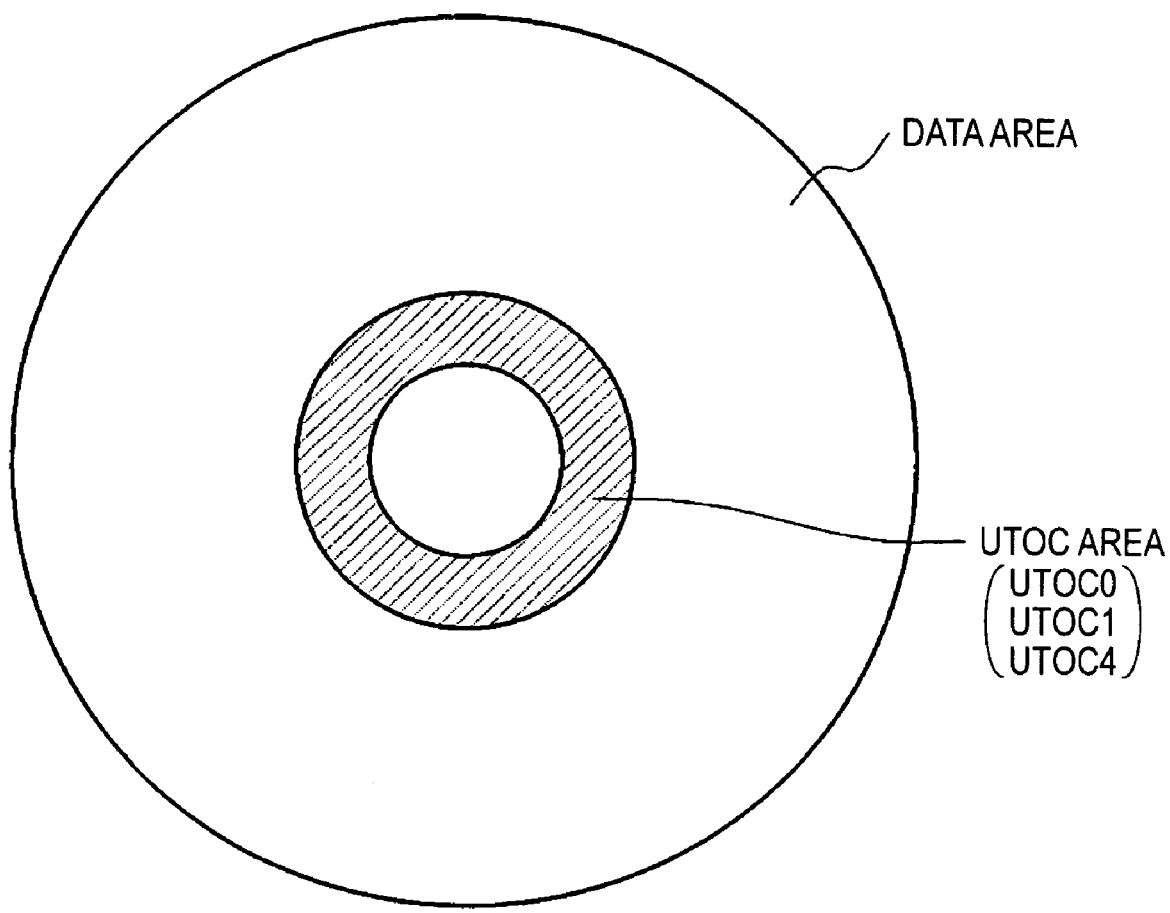
FIG. 16 shows an example of a disc structure.

FIG. 15 shows directories and files stored in a recording medium in a tree form. A directory\Video for storing video contents and a directory\Audio for storing audio contents are provided for a root directory\Root. Further, a directory\Video Data File for storing files of original video data and a directory\Video Track Index File for storing the file information of the directory Video Data File are provided for the directory\Video. Also, a directory\Audio Data File for storing files of original audio data and a directory\Audio Track Index File for storing the file information of the directory\Audio Data File are provided for the directory\Audio.

Further, the link table and entry table shown in FIGS. 9 and 10 are stored in the directory\Video Track Index File, and the link table and entry table shown in FIGS. 13 and 14 are stored in the directory\Audio Track Index File.

With this configuration, an object can be search for based on the contents of the object by referring to the tables stored in the directories\Video Track Index File and Audio Track Index File.

[9] Conclusion

According to the above-described system, in a case where video contents such as moving or still pictures and audio contents are to be recorded, meta information of the video and audio contents is extracted by extracting images and voices, and the extracted meta information is recorded as management information. In this method, an object can be searched for based on the contents of the object when a playback process is performed.

Video and audio contents are used in the above-described embodiment, but graphics or text information may also be used. In that case, meta information of the graphics and text data can be extracted by extracting images and text, and the meta information can also be recorded. For example, the meta information represents:

whose face if the object is a face;
whose voice if the object is a speaker;
what is spoken if the object is voice;
what image if the object is an image;
what is described if the object is text;
a place where something occurred if the object is a position; and
time when something occurred if the object is time.

Further, biological information of an objective person, such as pulse rate, respiratory rate, and blood pressure, can be recorded as meta information.

Contents are recorded/played back in the above-described embodiment, but the present invention can be applied in a case where contents are transmitted.

What is claimed is:

1. A recording device comprising:
   extracting means for extracting, from information forming contents, meta information representing a feature of the information; and
   recording means for recording the meta information extracted by the extracting means as management information by associating the meta information with the contents, further comprising:
   storage means for storing meta information for matching; and
   calculating means for calculating the similarity between the meta information extracted by the extracting means and the meta information for matching,
   wherein the recording means records the meta information in accordance with the similarity calculated by the calculating means.

2. A recording device according to claim 1, wherein the recording means further records link information for associating a plurality of pieces of said meta information if it is judged that the plurality of pieces of said meta information extracted by the extracting means are similar to each other.

3. A playback device comprising:
   playback means for reading and playing back contents from a recording medium by referring to meta information, the meta information, which has been extracted from information forming the contents and which represents a feature of the information, being recorded as management information in the recording medium by being associated with the contents, further comprising:
   storage means for storing meta information for matching; and
   calculating means for calculating the similarity between the meta information recorded in the recording medium and the meta information for matching,
   wherein the playback means selectively plays back the contents corresponding to the meta information in accordance with the similarity calculated by the calculating means.

4. A playback device according to claim 3, wherein, when link information for associating a plurality of pieces of said meta information is further recorded in the recording medium, the playback means refers to the meta information in accordance with the link information and plays back contents corresponding to the referred meta information.

* * * * *